Sept. 30, 1930. J. H. MILLER 1,776,793
ELECTRICAL MEASURING INSTRUMENT
Filed March 19, 1928 3 Sheets-Sheet 1
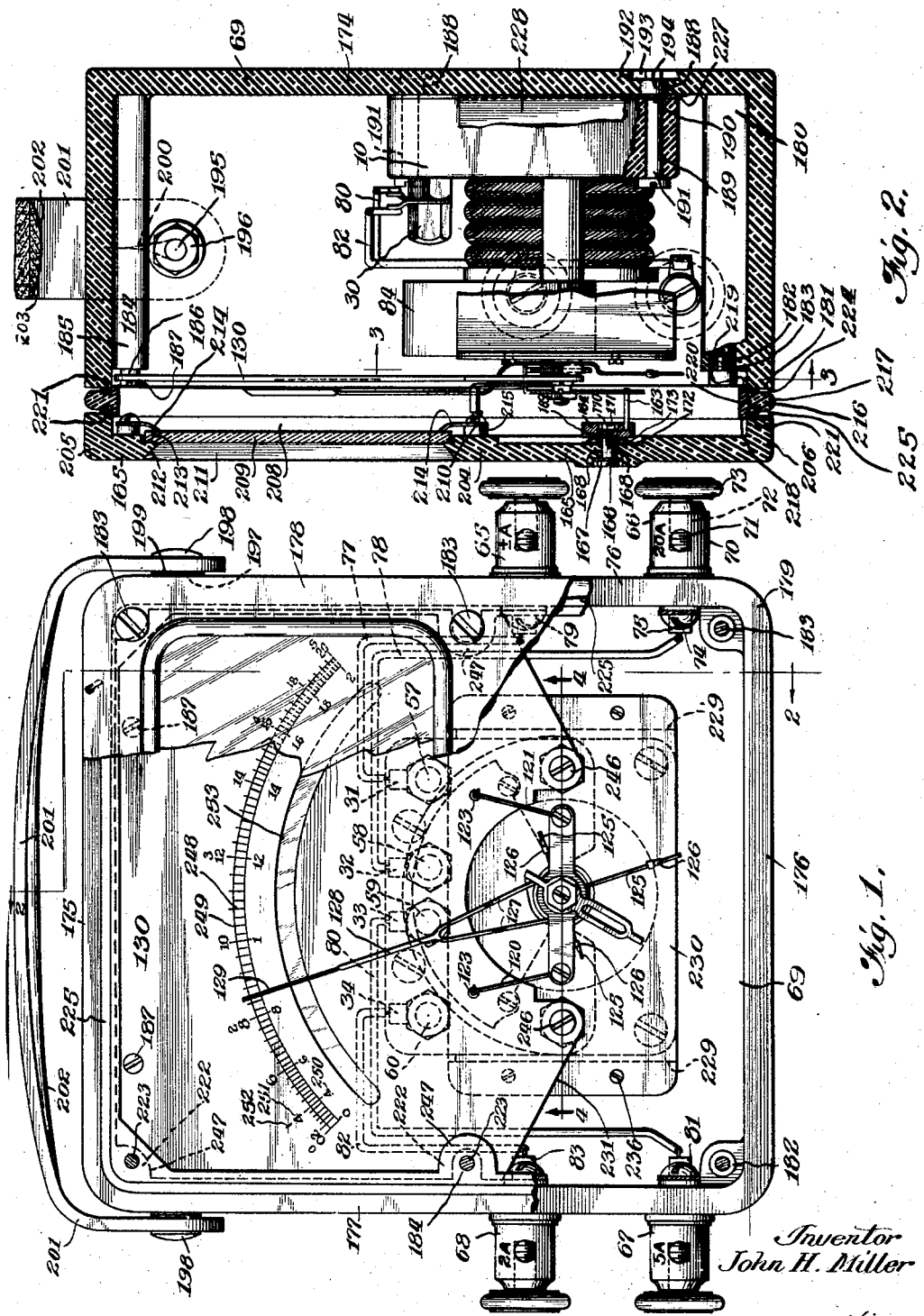
Inventor
John H. Miller
By Williams, Bradbury, McCaleb & Hinkle
Attys.

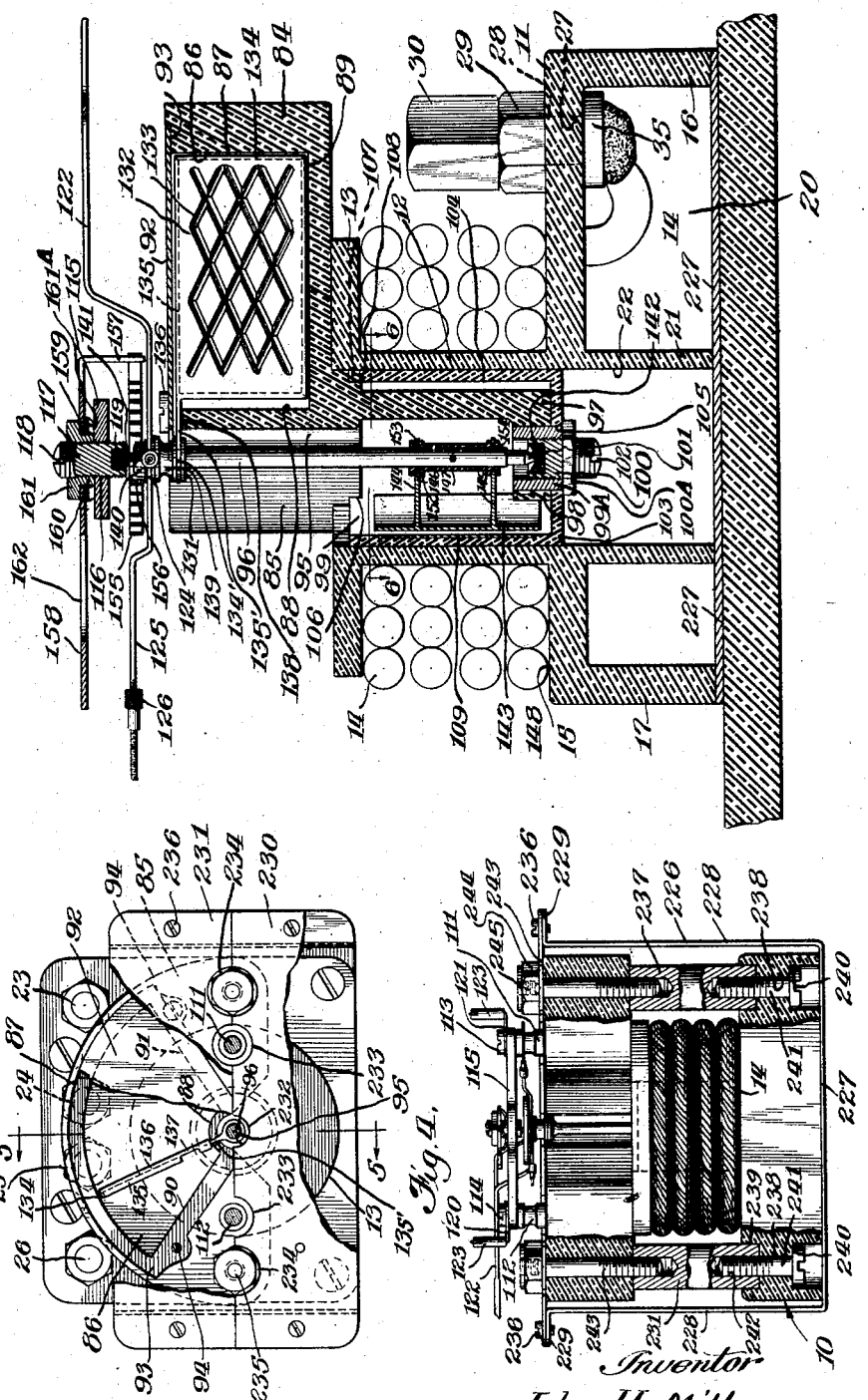

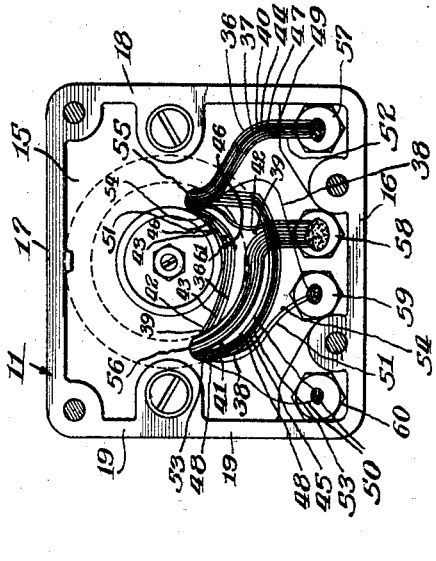
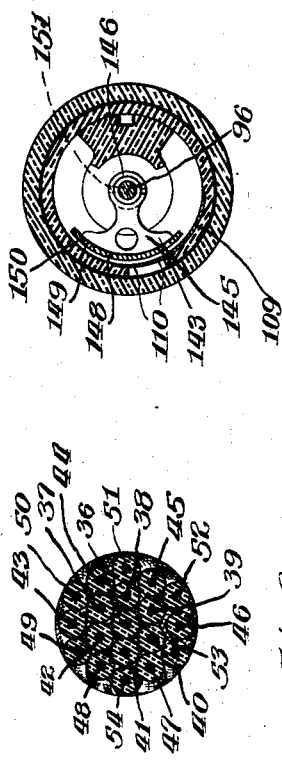
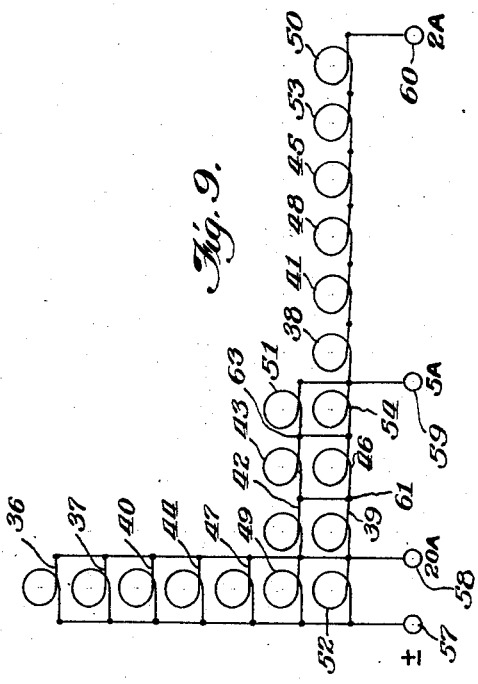

Patented Sept. 30, 1930

1,776,793

UNITED STATES PATENT OFFICE

JOHN H. MILLER, OF OAK PARK, ILLINOIS, ASSIGNOR TO JEWELL ELECTRICAL INSTRUMENT CO., OF CHICAGO, ILLINOIS, A CORPORATION OF ILLINOIS

ELECTRICAL MEASURING INSTRUMENT

Application filed March 19, 1928. Serial No. 262,797.

The present invention relates to electrical measuring instruments, and is more particularly concerned with the provision of multi-range instruments for measurement of current or voltage.

Many efforts have been made in the past to provide multi-range electrical measuring instruments, but the instruments of the prior art have necessitated the use of shunts or series resistances, or it has been necessary to provide a plurality of separate scales of different calibration and divisions upon the dial. The use of shunts or resistances involves additional equipment, more complicated electrical wiring outside the instrument, and mental calculation to arrive at the correct result, thereby increasing the cost of the instrument and equipment and increasing the possibility of error. It is also necessary to calibrate the instrument for each shunt, in order to insure accurate results. The use of a plurality of scales of different division and calibration is confusing, and also expensive, increasing the cost of manufacture and the time consumed in maintaining accuracy by calibration or otherwise.

One of the objects of the present invention is the provision of a multi-range electrical measuring instrument which does not require the use of auxiliary shunts or resistances and which is adapted to indicate accurately upon a single scale having a plurality of sets of numerals.

Another object of the invention is the provision of a novel casing structure for electrical measuring instruments, and a novel internal structure which is easier to manufacture and assemble, more economical, more durable and more thoroughly insulated than the instruments of the prior art.

Another object of the invention is the provision of an insulating casing for electrical instruments which is molded of a phenolic condensation product such as bakelite, and having a cover of the same material adapted to exclude air currents, dust, and other undesirable factors.

Another object of the invention is the provision of a novel actuating coil unit for electrical measuring instruments of the movable vane type, or other types, the separate wires or coils of which are so located as to produce substantially equal magnetic effect upon magnetic vanes, and which may therefore be employed for multi-range operation with a single division scale.

Another object of the invention is the provision of a novel indicating unit of the movable vane type, which may be more accurately formed and insulated by constructing its supporting member of molded bakelite or the like, thereby securing a more accurate operation and more effective damping, and reducing the cost of manufacture.

Another object of the invention is the provision of a novel instrument assembly including a supporting frame, which may also effect magnetic shielding of the instrument against terrestrial magnetism or that produced by adjacent electrical machinery.

Other objects and advantages of the invention will appear more fully from the following description and from the accompanying drawings, in which similar characters of reference indicate similar parts throughout the several views.

Referring to the drawings,

Figure 1 is a top plan view of my measuring instrument with the cover partially broken away to show the dial and internal mechanism;

Figure 2 is a side elevational view in cross-section taken on the line 2—2 of Figure 1;

Figure 3 is a top plan view of the coil unit and indicating unit taken on the plane of line 3—3 of Figure 2, with the framework and cover partially broken away to show the interior of the damping chamber;

Figure 4 is an elevational view of the units shown in Figure 3, partially broken away to show the interior structure of the supporting posts;

Figure 5 is a medial cross-sectional view of the coil unit and indicating unit in assembled relation, taken on the line 5—5 of Figure 3;

Figure 6 is a plan cross-sectional view through the spindle and vanes, taken on the line 6—6 of Figure 5;

Figure 7 is a cross-sectional diagrammatic view of the cable employed in winding the coil unit;

Figure 8 is a bottom plan view of the coil unit showing the connections made between the various coils; and Figure 9 is a wiring diagram of the coils employed to effect multi-range operation upon a single scale.

Referring to Figures 2 to 5, 10 indicates in its entirety the coil unit for my electrical measuring instrument, which is preferably molded of insulating material, such as bakelite. The coil unit is formed with a base 11, for convenience substantially rectangular in form, having an upwardly extending cylindrical member 12, terminating in an outwardly extending annular flange 13, forming a spool for the reception of the windings 14.

The base 11 preferably consists of a flat portion 15 of substantially rectangular shape, having downwardly extending walls 16, 17, 18 and 19, at each side, forming a hollow chamber 20 within which electrical connections may be made. In order to isolate the electrical connections from the mechanism of the indicating unit, the cylindrical wall 12 is extended downward as at 21, forming an accurately machined bore 22, within which the indicating unit fits.

The flat portion 15 of the base 11 is slightly extended at one side to provide room for the reception of a plurality of terminals 23, 24, 25 and 26, which may consist of bolts 27 passing through apertures 28 in the base 11 and secured thereon by nuts 29. The bolts are provided with cap nuts 30 for securing electrical connectors 31, 32, 33 and 34 upon conductors, which lead to the external terminals on the instrument casing, further to be described, and the heads 35 of the bolts 27 are employed for connection to the ends of the windings 14 by means of soldering or other convenient electrical connecting means.

I shall now describe the structure of the windings 14 which enable me to effect multi-range operation upon a single dial, having a plurality of sets of numerals. I prefer to wind the spool 12 with a cable composed of a plurality of conductors arranged in such manner that the average position of each conductor is such that each separate coil produces substantially the same electro-magnetic effect within the bore 22 of the spool.

Referring to Figure 7, I have here illustrated a preferred form of cable, and for a three range instrument the cable may consist of nineteen conductors. The cable may be formed by making the central conductor 36 of insulated copper wire, which may be cotton covered and impregnated with insulating cement, in order to assist in holding the conductors in proper position. About the central conductor 36 I place six other conductors 37, 38, 39, 40, 41 and 42. All of these conductors are twisted together in the same direction, so that each conductor appears upon the same side of the cable a plurality of different times throughout the length of the cable, with the exception of the central conductor 36, which, of course, is located at the axis of the cable. Within the crevices existing between the conductors 37 to 42, I place six additional conductors 43, 44, 45, 46, 47 and 48, and within the crevices formed by the latter six conductors, I place six more conductors, 49, 50, 51, 52, 53 and 54. All of the foregoing conductors are twisted in the same direction, as previously stated, and by the method descirbed, a substantially round cable may be formed which will be held together by the insulating cement, thereby facilitating the winding operation.

The cable 14 is wound upon the spool 12 in the usual manner, the beginning end of the cable being passed through an aperture 55 in the base 15 adjacent the cylindrical portion 12 of the spool. The cable is then wound in the regular manner with a plurality of turns side by side to the top of the spool, thence with a plurality of other regular turns downward to the bottom of the spool, thence in a similar manner to the top in the present instance, and the opposite end of the cable may be passed through an aperture 56 into the chamber 20 of the base 11. It will be obvious that any number of turns may be employed and any number of layers of winding, and it is possible by the foregoing method to wind sufficient cable upon the spool to secure the necessary amount of flux to actuate the instrument.

Referring to Fig. 9, I have here illustrated a wiring diagram showing the connections of the various conductors at the ends of the cable.

Although the various conductors are diagrammatically illustrated in Fig. 9, some being side by side and some being end to end, it will be understood by those skilled in the art that the physical position of these conductors upon the spool is that they are all side by side, forming a part of the cable, and each conductor has a plurality of turns about the spool represented diagrammatically in Fig. 9 by a single loop.

Referring to the wiring diagram, 57 indicates a common terminal marked ± which is used as one terminal in each of the multi-range operations. The numeral 58 indicates the other terminal for the 20-ampere scale marked "20A"; the numeral 59 indicates the other terminal for the 5-ampere scale, marked "5A"; and the other numeral 60 indicates the other terminal for the 2-ampere scale, marked "2A".

In order to provide coils for actuation of the instrument on the 20-ampere range, I select seven of the conductors of the cable 14 and connect them in parallel between the terminals 57 and 58. While some of the advantages of my invention may be realized by selecting any of the conductors of the cable, I prefer to select these conductors from the center of the cable and from symmetrical points inside and outside the cable. The first seven conductors are preferably therefore, the central conductor 36, two adjacent interior conductors 37 and 40, two exterior conductors 44 and 47 from one side of the cable, and two exterior conductors 49 and 52 from opposite sides of the cable.

In order to provide for the 5-ampere range of operation, I use the first mentioned seven conductors in parallel and connect thereto two sets of three conductors each in series, each set being in series with the first seven parallel conductors, and each set of three being in parallel with the other. For this purpose I prefer to select the following conductors from symmetrical points, inside and outside of the cable, and the second set of six conductors may consist of the conductors 42 and 39, each having one end connected to the terminal 58; the conductors 43 and 46 from the exterior of the cable each having an end joined with the opposite ends of the conductors 42 and 39 as at the point 61; and the conductors 51 and 54 each having one end joined to the opposite ends of the conductors 43 and 46 as at 63, the opposite ends of the conductors 51 and 54 being connected to the terminal 59 marked "5A".

For the third 2-ampere range of operation I employ the foregoing connections together with the remaining six of the conductors of the cable connected in series with each other and in series with the foregoing system of conductors. Thus one end of the conductor 38 from the interior of the cable may be connected to the terminal 59 and the opposite end of the conductor 38 connected to one end of the conductor 41. The opposite end of the conductor 41 is connected to one end of the conductor 48; the opposite end of the conductor 48 is connected to one end of the conductor 45; the opposite end of the conductor 45 is connected to one end of the conductor 53; the opposite end of the conductor 53 is connected to one end of the conductor 50; and the opposite end of the conductor 50 is connected to the terminal 60 marked "2A".

It should be noted that in every case these connections are so made that the current runs in the same direction through the coils of the cable; otherwise the ampere turns of one coil would counteract the effect of another.

Referring to Fig. 8, I have here shown the actual electrical connections made within the base of the spool of the coil unit and referring to the terminal 57, it will be noted that seven conductors from one end of the cable are brought out and soldered to the head of the terminal 57. These are the left ends of the conductors 36, 37, 40, 44, 47, 49 and 52.

Referring to the terminal 58, it will be noted that there are attached to this terminal seven conductors coming from the outside of the spool and two conductors coming from the inside of the spool. The seven conductors are the right-hand ends of the conductors 36, 37, 40, 44, 47, 49 and 52 and the two conductors connected to this terminal are the left-hand ends of the conductors 42 and 39.

Referring to the terminal 59, it will be noted that three conductors are secured to this terminal, two coming from the inside of the coil being the right-hand ends of the conductors 51 and 54, and one coming from the outside of the coil, being the left-hand end of the conductor 38.

The intermediate connections at the points 61 and 63 of the diagram in Fig. 9 are shown in Fig. 8 under the same numerals, in each case four conductors being connected together. At the point 61 two conductors 39 and 42 coming from the outside of the coil are connected to two more conductors 43 and 46 coming from the inside of the coil. These are the right-hand ends of the conductors 39 and 42 connected to the left-hand end of the conductors 43 and 46 in Fig. 9.

In a similar manner, the right-hand end of the conductors 43 and 46 are connected to the left end of the conductors 51 and 54.

Referring to the terminal 60 it will be noted that but one conductor is secured to this terminal, this being the right-hand end of the conductor 50 coming from the outside of the spool. The intermediate connections between the conductors 38, 41, 48, 45, 53 and 50 are made by taking the right-hand ends of conductor 38 from the outside of the spool and connecting to the left-hand end of conductor 41; the right-hand end of the conductor 41 from the outside of the spool and connecting to the left-hand end of the conductor 48 from the inside of the spool; the right-hand end of the conductor 48 from the outside of the spool and connecting to the left-hand end of the conductor 45 from the inside of the spool; the right-hand end of the conductor 53 from the outside of the spool and connecting to the left-hand end of the conductor 50 from the inside of the spool, respectively.

As previously stated, the right-hand end of the conductor 50 is connected to the terminal 60.

In the foregoing explanation, the right-hand end of any coil as shown in Fig. 9 is taken as the end of the coil emerging from the opening 56 at the outside of the spool and the left-hand end of any coil as shown in Fig. 9 is taken as the end of the coil in Fig. 8 emerging from the opening 55 at the inside of the spool. The connections described are preferably made by soldering the wires to the terminal and by soldering the respective wires together at their ends as described and covering the soldered joints by a short piece of tubular insulation known as macaroni.

I shall now illustrate how the foregoing connections produce a magnetomotive force of the same number of ampere-turns for each range of operation so that the same scale may be used by employing different sets of numerals.

Assuming there are twelve turns of the cable about the spool, when the 20-ampere range is being used and twenty amperes of current are passing through the instrument, there will be 20/7 amperes passing through each of the conductors 36, 37, 40, 44, 47, 49 and 52, since these conductors are connected in parallel. The total ampere-turns will then be:

20/7 amp. × 7 wires × 12 turns per wire = 240 amp.-turns.

When the instrument is employed upon the 5-ampere range and five amperes are passing through the instrument, the amount of current in the first seven conductors will be 5/7 amperes per conductor, since these are connected in parallel and the current will be equally divided among them.

Since the next six conductors are connected in two parallel rows of three each, the current of five amperes will be divided equally between these two rows and two and one-half amperes will pass through each conductor.

The total number of ampere-turns for this range of operation may then be calculated as follows:

For the first seven conductors

5/7 amp. × 7 wires × 12 turns per wire = 60 amp.-turns

For the second set of six conductors

2½ amp. × 6 wires × 12 turns per wire = 180 amp.-turns 240 amp.-turns

For the third range of operation of two amperes, we may likewise calculate the number of ampere turns at full scale indication of two amperes as follows:

For the first set of seven conductors in parallel, the two amperes will be divided equally among these coils, giving 2/7 of an ampere per coil; for the second set of six conductors in two rows of three coils each, the two amperes will be divided between the two branches equally, giving one ampere per coil; and for the last six conductors in series, there will be two amperes flowing through each coil.

The total number of ampere-turns is calculated as follows:

For the first seven conductors

2/7 amp. × 7 wires × 12 turns per wire = 24 amp.-turns

For the second set of six conductors 1 amp. × 6 wires × 12 turns per wire = 72 amp.-turns For the last set of six conductors 2 amp. × 6 wires × 12 turns per wire = 144 amp.-turns Total _____ 240 amp.-turns It will thus be observed that at the current value corresponding to the full scale of each range of operation, the number of ampere-turns of magneto-motive force is the same for each range and the repelling force generated between the moving vane and the fixed vane will be equal under these circumstances for each range of operation.

It will be evident to those skilled in the art that with the foregoing arrangement of coils and electrical connections, the instrument will likewise be adapted to indicate at the same point for each of the three ranges for fractional values of the full range current, and I am thus enabled to use a single scale for a multiple range instrument without the assistance of auxiliary shunts or series resistances. The arrangement of the respective coils in a cable so that the average position of each coil is practically the same, producing substantially the same magnetic effect upon the vanes, and the selection of the conductors from symmetrical points within the cable have been found to produce a high degree of accuracy with the single scale employed.

Referring now to Fig. 1, I shall describe the electrical connections between the terminals 57, 58, 59 and 60 and electrical connectors 65, 66, 67 and 68 located upon the exterior of the casing 69.

The connectors 65 to 68 inclusive may be of any standard construction, and in the present embodiment may consist of an enlarged cylindrical exterior metal body 70 having a transverse aperture 71 adapted to receive a conductor and having an axial bore 72 threaded to receive a clamping screw bolt 73. The opposite end of the body 70 is likewise provided with an axial bore threaded to receive a screw bolt 74 passing through a flat electrical connector 75, and through the wall 76 of the casing to clamp said connector and the wall of the casing between the head of the screw and body 70 of the connector.

As the casing 69 is preferably constructed of insulating material, no insulating washers are located upon the connectors which are effectively insulated from each other by the casing itself.

The terminal 57 upon the coil unit is connected by means of a conductor 77 and connector 79 with the terminal 65 carried by the casing and appropriately designated ±A by white symbols printed upon the black casing adjacent the terminal. This is the common terminal which is employed for use of any of the three ranges of operation.

In a similar manner, the terminal 58 is connected by means of a connector 32, conductor 78 and connector 75 to the terminal 66 designated "20A" to indicate the terminal for the 20-ampere range of operation.

The terminal 59 upon the coil unit is likewise connected by means of a connector 33, conductor 80 and connector 81 to the terminal 67 carried on the exterior of the casing and designated "5A" to indicate the second terminal for the 5-ampere range of operation.

The terminal 60 upon the coil unit is connected by means of a connector 34, a conductor 82 and a connector 83 to the terminal 68 carried on the exterior of the casing, and designated "2A" to indicate the second terminal for the 2-ampere range of operation.

The connectors 31 to 34 and 75, 79, 81 and 82 comprise flat pieces of metal having apertures to receive the screw bolts of the terminals and having a projecting flange to which the conductors 77, 78, 80 and 82 may be soldered.

I shall now describe the structure of the indicating unit of my measuring instrument, and by the term "indicating unit" I designate that portion of the structure supporting and including the movable mechanism actuated by the coil unit.

Referring to Fig. 5, 84 indicates in its entirety my indicating unit which comprises a body member 85 preferably constructed by molding the same of insulating material such as bakelite. The upper portion of the body 85 is substantially semi-circular in cross-section as shown in Fig. 3 and is formed with the fan-shaped damping chamber 86. The damping chamber is thus provided with two concentric circular walls 87 and 88, a flat bottom 89 and a pair of radial walls 90 and 91. The top of the damping chamber 86 is open, being closed by a cover plate 92 of sheet metal and of a size adapted to overlie each of the walls 90, 91, 87 and 88.

The cover plate 92 is preferably set in a groove 93 at the top of said walls, flush with the upper surface of the body 84 and the cover plate may be secured in place by a plurality of screw bolts 94 threaded through a shield (further to be described), and the cover plate into the bakelite body 84.

The body 84 is provided at the side opposite the damping chamber 86 with a groove 95 extending parallel to the walls 87 and 88 and adapted to house a spindle 96. The body 84 is also provided with an integral downwardly projecting lug 97 having one side 98 formed like a portion of a cylinder and the opposite side 99 forming an extension of the groove 95. The lower end of the extension 97 extends at substantially right angles as at 98 and is provided with a threaded member 99A molded therein, and adapted to receive a threaded screw bolt 100 having a jewel 101 and a kerf 102. The threaded member 99 is of substantially cylindrical exterior shape and projects from the transverse portion 98 by an amount equal to the thickness of the wall 103 of the insulating cylinder 104.

The insulating cylinder 104 comprises an insulating member preferably constructed of bakelite and adapted to fit accurately within the cylindrical bore 22 of the coil unit 11. The insulating cylinder 104 is provided with a flat bottom 103 having a centrally disposed bore 105 adapted to fit about the threaded member 99.

The interior of the insulating cylinder 104 is likewise cylindrical in form and the upper end of the cylinder is adapted to fit about an annular shoulder 106 formed upon the body 84 about the groove 95. While the annular shoulder 106 does not form a complete circle, it extends beyond the range of a semi-circle on each side, thereby providing sufficient cylindrical surface upon the annular shoulder 106 to definitely fix the position of the upper end of the insulating cylinder 104.

The annular shoulder 106 is provided at any point 107 with a projecting lug which is adapted to extend into a complementary groove 108 on the insulating cylinder 104. It will thus be observed that the lug 107 constitutes a stop member which prevents relative rotation between the insulating cylinder and the body 84 of the indicating unit.

The insulating cylinder is provided with a fixed vane 109 comprising a relatively thin piece of sheet metal of magnetic properties bent to cylindrical form and molded within the insulating cylinder 104 flush with its inner surface. The fixed vane may be provided with a pair of air holes 110 and it will be observed that the location of the stop lug 107 also determines the proper position of the fixed magnetic vane relative to the other parts of the mechanism.

The indicating unit body 84 is provided with a pair of screw bolts 111 and 112 molded within the insulating body and projecting from its upper surface on either side of the groove 95. The screw bolts 111 and 112 are accurately located relative to the threaded member 99 so that these members may form the support of the jewels which carry the spindle of the indicating unit in accurate axial position relative to the insulating cylinder 104 and to the coil unit in which the insulating cylinder fits.

The screw bolts 111 and 112 are provided with threaded axial bores adapted to receive a pair of screw bolts 113 and 114 passing through apertures in a bridge 115 comprising a short strip of sheet metal. The bridge 115 is provided with a centrally located threaded bore 116 adapted to receive a screw bolt 117 having a kerf 118 at one end and a jewel 119 at the opposite end.

The screw bolts 114 and 113 which secure the bridge to the indicating unit are also employed for securing a pair of stop members 120 and 121, each comprising a short length of flat wire having one loop secured beneath one of the screw bolts 113 or 114 and extending forward on either side above the damping chamber 86 to provide a stop for the pointer 122.

At their forward ends the stop members 120 and 121 are bent up at substantially right angles and this bent-up portion is covered by a short tube of lava 123, the tubes being secured in place by bending over the ends of the wire projecting from the tube. I prefer to use stop members of lava for the reason that I have found that there is no adhesion, electrical or otherwise, between the pointer and the stop member of lava which will prevent the actuation of the needle at very small current values, such as would be the case were glass or other insulating tubes employed.

The pointer 122 may consist of a light aluminum member formed of sheet metal having a small central plate 124 with an aperture adapted to receive the spindle 96 and a plurality of threaded arms 125 adapted to receive nuts 126 for the purpose of balancing the pointer 122. The pointer is preferably formed with a fork 127 extending from the plate 124 ending in a single arm 128 which is flattened at 129 in a plane perpendicular to the dial 130.

The spindle 96 comprises a light aluminum rod which is formed with an integral flange 131 adjacent its upper end, a reduced threaded portion extending upward from said flange. The damping vane 132 comprises a thin aluminum plate provided with transverse corrugations 133 for increasing its strength and with flanges 134 and 135 about its edge at substantially right angles for the same purpose.

The size of the damping vane 132 is such that it fits accurately within the damping chamber 86 and it is adapted to be supported upon the spindle 96 extending from the curved surface 87 to its concentric surface 88 and swinging in an arc within the damping chamber.

The damping vane 132 may be supported upon the spindle by a plate of sheet metal 134' having a projecting arm 135' extending into the boxlike damping vane below the upper flange 135. The damping vane may be secured to the arm 136 by bending down a portion 137 of the flange 135 about the arm 136.

It should also be noted that the short curved wall 88 of the body 84 is slightly shorter than the other walls of the damping chamber providing an aperture 138 between the wall 88 and the cover plate 92 through which the arm 136 may extend into the damping chamber.

Above the damping vane plate 134 the spindle may be provided with a spacing member 139 after which the pointer 122 may be placed upon the spindle and secured by a nut 140. Each end of the spindle is provided with a hardened steel point 141 and 142 adapted to be journaled in the jewels 119 and 101 respectively, to rotatably support the spindle with a minimum of friction.

At the lower end of the spindle adjacent the insulating cylinder 104 and the fixed magnetic vane 109, the spindle carries a second vane 143 of magnetic material which will be hereafter called the movable vane, being supported for rotation by means of the spindle 96.

The movable vane 143 comprises a relatively thin piece of sheet metal of substantially the same size as the fixed vane 109 and bent concentrically with the interior of the insulating cylinder 104 and with the surface of the fixed vane 109 from which it is spaced a very small distance.

The movable vane 143 may be supported by a pair of sheet metal arms 144 and 145, each comprising a thin plate of sheet metal of substantially the shape shown in Fig. 6, having an aperture 146 adapted to receive a sleeve 147 and having an outer curved edge 148 with a plurality of projecting lugs 149. The movable vane 143 may be affixed to the arms 144 and 145 by passing the lugs 149 through apertures 150 in the movable vane and riveting the vane upon the arms by means of said lugs.

The arms 144 and 145 may be secured to the spindle 96 by means of a sleeve 147 adapted to fit closely about the spindle 96 and secured thereto by a pin 151 riveted through said sleeve and spindle.

The sleeve 147 is provided with an annular shoulder 152 at each end and a reduced cylindrical portion 153 at each end adapted to be received in each of the apertures 146 of the arms 144 and 145. The arms 144 and 145 may then be secured to the sleeve by riveting or peening over the ends of the sleeve as at 154.

The spindle 96 is also provided with resilient means for biasing the pointer to zero position and for resisting the forces of repulsion generated by the electromagnetic flux of the coil unit. This resilient means may consist of a coil spring 155 consisting of a spiral spring formed of a flat ribbon of spring steel or phosphor bronze. The inside end of the spiral spring 155 may be bent downward as at 156 and secured to the spindle by providing the end of the spring with an aperture adapted to receive the threaded end of the spindle and to be clamped in place by the nut 140.

The outer end of the spring 155 is preferably secured to a downwardly turned flange 157 of a zero adjustment lever 158 by soldering or other convenient fastening means. The zero adjustment lever 158 comprises a relatively thin plate of sheet metal having an aperture 159 adapted to receive the reduced end 160 of the nut 161 and also having a downwardly turned flange 157 adapted to be secured to the spiral spring 155.

The nut 161 consists of an ordinary nut having a reduced cylindrical portion 160 adapted to rotatably support the zero adjustment lever 158 and also to support a crimped spring washer 161A interposed between the zero adjustment lever 158 and the bridge 115. The nut 161 may be threaded upon the screw bolt 117 into engagement with the bridge 115 also serving as a lock nut for the jeweled screw bolt 117.

At the opposite end of the spindle the jeweled screw bolt 100 is also provided with a lock nut 100A serving to lock the screw bolt in place and to retain the insulating cylinder 104 upon the indicating unit.

At the opposite end of the flange 157 the zero adjustment lever is provided with an elongated slot 162 which is adapted to receive a pin 163 eccentrically carried by a molded bakelite member 164 rotatably supported upon the cover 165.

The cover 165 is preferably provided with a bore 166 adapted to receive the head of an adjustment screw 167 flush with the upper surface, and with a counter-bore 168 for receiving the stem of the adjustment screw 167. The adjustment screw 167 is provided with a flattened or noncircular inner end 169 adapted to be received in a complementary aperture 170 in the molded insulating member 164, and the insulating member 164 may be secured to the adjustment screw 167 by a small screw bolt 171 passing through a central aperture in the insulating member and threaded in the end of the adjustment screw 167.

The molded insulating member 164 may be of substantially cylindrical shape, having a metallic pin or wire 163 secured therein by molding the same in place, substantially parallel to the axis of the cylinder, but eccentrically disposed relative to said axis.

In order to retain the adjustment screw 167 in any adjusted position, I prefer to provide a fiber washer 172 and a crimped spring washer 173 interposed between the insulating member 164 and the lower surface of the cover 165. When the cover is in proper position, closing the instrument, the pin 163 projects into the slot 162 of the zero adjustment lever.

It will thus be observed that by inserting a screw driver or other instrument in the kerf of the adjustment screw 167 and by rotating said screw, the pin 163 will be caused to move in an arcuate path, sliding in the slot 162 and rotating the zero adjustment lever 158 in a similar direction.

The rotation of the zero adjustment lever 158 will carry with it the outer end of the spring 155 causing the inner end of the spring to rotate the spindle 96 and the pointer 122 until the pointer reaches the proper zero position.

I shall now describe the novel insulating casing in which my electrical measuring instrument is enclosed. The casing 69 may consist of an enclosing member of any convenient shape, but preferably having a flat bottom 174 and four side walls 175, 176, 177 and 178 at substantially right angles to the base 174. The corners 179 are preferably rounded to present a finished appearance and to prevent the chipping off of pieces as might be the case were sharp corners employed.

I prefer to form the enclosing member 69 of molded insulating material such as bakelite and I provide the walls of the casing with ribs 180 in each corner, extending from the bottom to a point adjacent the open top 181. The corner ribs are preferably provided with nuts 182 molded therein at their upper ends and adapted to be used in conjunction with screw bolts 183 for securing the cover 165 upon the casing 69. Similar ribs and nuts may also be provided as at 184 at intermediate points on the inside of the walls 177 and 178.

In order to secure the dial 130, I also provide a pair of similar ribs 185 having similar threaded members 186 for securing the upper end of the dial 130 by means of screw bolts 187 and the bottom 174 of the casing is provided with a plurality of apertures 188 disposed to register with apertures 189 in the coil unit and apertures 190 in the shield (further to be described) for securing the coil unit and shield to the base by a plurality of screw bolts 191.

The apertures 188 are preferably provided with enlarged counter-apertures 192 adapted to receive the non-circular head 193 of the nut 194 flush with the bottom of the casing.

As previously described, the walls 177 and 178 are also provided with apertures for securing the electrical connectors 65, 66, 67 and 68 which form the exterior terminals of the instrument.

In order to provide the casing with a handle, the walls 177 and 178 may each support a screw bolt 195 secured to the wall by a nut 196, said screw bolt having a pair of spaced heads 197 and 198 forming a groove 199 adapted to receive the slotted and apertured ends 200 of a leather strap 201.

The strap may also be provided with a reinforcing strap 202 secured to its underside by stitching 203 in order to give the handle the required degree of stiffness.

The cover 165 comprises a closure of substantially the same shape as the casing 69, having a flat top 204 and depending walls 205, 206, 207 and 208. The walls 205 to 208 are of relatively small depth, being provided only for the purpose of giving clearance for certain parts carried by the cover, such as the window 209 and its securing screws 210.

The cover 165 is provided at its upper half with an aperture 211 formed with a beveled outer edge 212, and an inner shoulder 213 adapted to support the window 209. The window 209 lies against the shoulder 213 on the inside of the cover and is secured in place by a plurality of spring fingers 214 carried by screws 210 passing through spacing sleeves 215 and threaded into the cover 165. A layer of plastic cement is also interposed between the shoulder 213 and the glass 209 in order to secure a dust-tight joint.

In order to insulate completely the instrument and to increase the factor of safety for those using the instrument, I prefer to form the cover 165 of molded insulating material such as bakelite in the same manner as the casing 69, the cover being provided with a plurality of apertures for receiving screw bolts 183 to secure the cover to the casing 69.

In actual practice it is found, however, that it is practically impossible to mold an insulating casing of substantial size such as is required for an electrical measuring instrument of this type, and to mold a complementary insulating cover which will fit accurately upon each other without any warping, rocking or substantial cracks at various points between these members.

In order to obviate this difficulty and to provide a dust-tight casing, I interpose between the casing 69 and the cover 165, a skeleton frame 216 which may be also formed of molded insulating material, and which is preferably provided with a rounded outer edge 217 forming a rib. The skeleton frame 216 comprises a four-sided frame having an upwardly projecting flange 218 adapted to be slidably received within the walls of the cover and a downwardly projecting flange 219 adapted to be slidably received within the walls of the casing 69.

Just outside the flanges 218 and 219, the skeleton frame is provided with grooves 220 above and below, and adapted to receive resilient gaskets 221 which may consist of rubber bands of a size adapted to fill said groove and to project above the top and bottom of the bead 217. The skeleton frame is also provided with projecting lugs 222 at the corners and sides, the lugs having apertures 223 to receive the same screw bolts 183 which affix the cover 165 to the casing 69.

It will thus be observed that when the casing, skeleton frame and cover are assembled as shown in Fig. 2, the skeleton frame may be firmly clamped between the cover 165 and casing 69 and the resilient gaskets 221 will compensate for any unevenness of fit or warping between the cover and casing. Furthermore, since it is inevitable that cracks must appear at some points between the juncture of the cover and casing, I prefer to provide the skeleton frame having an exterior rib 217 which naturally provides cracks 224 or crevices 225 on either side of the rib, and the slight additional discrepancy of fit between the cover and casing is thus added to the cracks on either side of the skeleton frame rib which renders any unevenness of fit invisible to the eye.

In order that the coil unit, indicating unit, casing and dial, may be firmly and accurately assembled, and in order that the electromagnetic mechanism may be shielded from outside magnetic effects, I prefer to provide my measuring instrument with a supporting frame 226 which also comprises an electromagnetic shield for the same. The shield 226 may consist of a strip of sheet metal of sufficient width to embrace the spool 12 and coils 14 and bent to the conformation shown in Fig. 4.

The shield 226 thus has a flat bottom 227 which is apertured to receive the same screw bolts 191 which fasten the coil unit to the casing and the shield has a pair of upwardly extending walls 228 of the same height as the combined coil unit and indicating unit as shown in Fig. 4, terminating in outwardly bent affixing flanges 229.

The top of the shield is completed by a pair of similar plates 230 and 231 of sheet metal of paramagnetic material, having grooves 232 for the spindle 96, for the threaded members 112 and 234, and for the screw bolts 235 which secure the indicating unit to the coil unit.

When the plates 230 and 231 are laid across the securing flanges 229 on either side of the spindle which is above the body of the indicating unit 84, the grooves 232, 233 and 234 form circular apertures embracing the spindle and bolts aforementioned, so that the shield plates 230 and 231 may be affixed after the coil unit and indicating unit have been assembled.

The shield plates are secured in place by screw bolts 236 passing through the outer edge of each plate into the securing flange 229 of the shell frame 226, and also by the screw bolts 94 passing through both the shield plate 231 and cover plate 92 of the damping chamber 86 into the body 84 of the indicating unit.

In order that both shield plates may be identical for convenience of manufacture, all of the shield plates 230 and 231 are also provided with apertures for the screw bolts 94 although not required on the shield plate 230.

Besides the shielding frame 226, the indicating unit and coil unit are also provided with means for securing the same together, comprising a pair of metal posts 237 secured at one end to the indicating unit and at the opposite end to the base of the coil unit 11. For this purpose the base of the coil unit may be provided with a pair of bores 238, one at each side, each leading to a counter-bore 239 above and a counter-bore 240 below.

The counter-bore 239 is adapted to receive the end of the cylindrical post 237 which is secured in place by a screw bolt 241 having its head concealed in the counter-bore 240 and its opposite end threaded into a threaded bore 242 in the posts 237.

The posts 237 are of sufficient length so that when the indicating unit has its cylindrical insulating member 104 in proper position in the bore 22 and its body 84 resting flatly upon the upper flange 13 of the spool, the upper ends of the posts 237 lie against the lower edge of the body 84 of the indicating unit at each side. The body 84 of the indicating unit may then be secured to the posts 237 and to the coil unit by a pair of screw bolts 243 passing through the body 84 and threaded into the posts 237.

The non-circular heads 244 of the screw bolts 243 are embraced by the grooves 234 of the shell plates 230 and 231, but do not interfere therewith and the heads 244 are provided with threaded apertures 245 adapted to receive screw bolts 246, securing the lower end of the dial 130 to the coil unit and indicating unit.

The dial 130 comprises a flat plate of sheet metal such as brass or the like, having its upper surface covered with a layer of paper cemented or otherwise secured thereto. The dial plate is provided with grooves 247 for the reception of the ribs 222 at the corners and sides of the casing, and as previously described, the dial is affixed to the casing at the top by screws 187 and to the indicating unit at the bottom by screw bolts 246.

The dial is provided with a single arcuate scale 248 having radial division marks 249 of the usual type and proper calibration.

As my multiple range instrument is adapted to read upon the same scale divisions in each range, but one set of scale divisions is required and a plurality of sets of numerals is employed. Thus the lower set of numerals 250 ranges from zero to two amperes; above the scale the second set of numerals 251 ranges from zero to twenty amperes, and above this set of numerals is a third set 252 ranging from zero to five amperes.

Below the arcuate scale divisions, the dial is provided with the usual arcuate slot 253 in the paper cover, exposing a mirrored surface upon the dial plate which serves the usual purpose of enabling the operator to place his eye directly above the flat pointer to avoid the errors in reading the instrument, which are due to improper location of the eye.

The assembly of the foregoing parts will be obvious to those skilled in the art and the operation of the instrument is as follows:

It will be evident that the operation is the same for any one range of operation, whether it be 2-ampere, 5-ampere or 20-ampere.

I desire it to be understood that the foregoing ranges of operation are merely illustrative of one embodiment of my invention and I do not wish to be limited to the ranges set forth. It should also be understood that the specific form of the cable may be varied, while still realizing many advantages of my invention, and my invention includes other equivalent arrangements of conductors and connections according to the same principle of operation.

My electrical measuring instrument may be employed either as an ammeter or volt meter, depending upon the resistance of the coils employed and the method of their connection.

In the use of my instrument as an ammeter, connection of the terminal 65 marked ±A and any other one of the terminals in an electrical circuit will permit the flow of current in the circuit through the corresponding electrical conductors connected to said terminals. The current flowing through the corresponding coils will result in the generation of lines of magnetic flux, the direction of which will be controlled by well-known physical laws and which will result in the passage of flux in a certain direction through the bore 23 of the coil unit and outward about the coil to meet each other in a continuous magnetic circuit.

The fixed magnetic vane 109 and the movable magnetic vane 143 being included in said magnetic circuit and presenting a much lesser reluctance to the passage of magnetic lines of flux than the air, the tendency of such lines of flux will be to pass through said magnetic vanes as far as possible, polarizing said vanes, and a resultant force will be developed between the two magnetic vanes due to the proximity of like magnetic poles at each end of the vanes, causing the vanes to repel each other.

The magnetic vane 109 being fixed and the magnetic vane 108 being pivoted upon the spindle 96, the latter will be repelled from the former and rotated with the spindle 96 away from the fixed vane, and the force tending to separate these vanes will be opposed by the spring 155.

The scale 248 is accurately calibrated to indicate the number of amperes flowing in the circuit in which the terminals of the instrument are connected, and the reading of the instrument is of course made by using the set of numerals corresponding to the range indicated upon the terminals used.

It will thus be observed that I have invented a multiple range electrical measuring instrument which is adapted to indicate the quantities measured upon a single scale with accuracy; which is enclosed in an insulating casing and constructed of molded insulating parts in such manner that the instrument is better insulated and more safe for use than any of the instruments of the prior art; and which is more economically manufactured and more accurate than the instruments which employ shunts or series resistance for multiple range operation.

While I have illustrated and described a specific embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States is:

1. In an electrical measuring instrument, a coil unit comprising a supporting spool member, and a symmetrically twisted cable wound upon said spool member to form a plurality of coils, having their component parts substantially uniformly distributed about said spool to produce substantially equal magnetic effect within said spool, one set of said coils being connected in series for one range of instrument indication.

2. In an electrical measuring instrument, a coil unit comprising a supporting spool member, and a symmetrically twisted cable wound upon said spool member to form a plurality of coils, having their component parts substantially uniformly distributed about said spool to produce substantially equal magnetic effect within said spool, one set of said coils being connected in series for one range of instrument indication, and a second set of paralleled coils being connected in series with said first set for a second range of instrument indication.

3. In an electrical measuring instrument, a coil unit comprising a supporting spool member, a symmetrically formed cable wound upon said spool member to form a plurality of coils, having their component parts substantially uniformly distributed about said spool to produce substantially equal magnetic effect within said spool, one set of said coils being connected in series for one range of instrument indication, and a second set of paralleled coils being connected in series with said first set for a second range of instrument indication, indicating means actuated by said coils when energized and a scale for indicating on either range of operation.

4. In an electrical measuring instrument, a coil unit comprising a supporting spool member, a symmetrically formed cable wound upon said spool member to form a plurality of coils, having their component parts substantially uniformly distributed about said spool to produce substantially equal magnetic effect within said spool, one set of said coils being connected in series for one range of instrument indication, and a second set of paralleled coils being connected in series with said first set for a second range of instrument indication, an instrument terminal connected at one end of said first-mentioned set, a second terminal between said sets and a third terminal at the other end of said second set.

5. In an electrical measuring instrument, a coil unit comprising a supporting spool member, and a symmetrically formed cable wound upon said spool member to form a plurality of coils, having their component parts substantially uniformly distributed about said spool to produce substantially equal magnetic effect within said spool, one set of said coils being connected in series for one range of instrument indication, and a second set of paralleled coils being connected in series with said first set for a second range of instrument indication, the coils for each of said sets being selected from symmetrical points in said cable.

6. In an electrical measuring instrument, a coil unit comprising a supporting spool member, and a symmetrically formed cable wound upon said spool member to form a plurality of coils, having their component parts substantially uniformly distributed about said spool to produce substantially equal magnetic effect within said spool, one set of said coils being connected in series for one range of instrument indication, a second set of paralleled coils being connected in series with said first set for a second range of instrument indication, and a third set of coils in parallel with each other and in series with said first-mentioned and second sets, for a third range of operation.

7. In an electrical measuring instrument, a coil unit comprising a supporting spool member, and a symmetrically formed cable wound upon said spool member to form a plurality of coils, having their component parts substantially uniformly distributed about said spool to produce substantially equal magnetic effect within said spool, one set of said coils being connected in series for one range of instrument indication, a second set of paralleled coils being connected in series with said first set for a second range of instrument indication, and a third set of coils in parallel with each other and in series with said first-mentioned and second sets, for a third range of operation, the coils for each of said sets being selected from symmetrical points in said cable.

8. In an electrical measuring instrument, a coil unit comprising a supporting spool member, a symmetrically formed cable wound upon said spool member to form a plurality of coils, having their component parts substantially uniformly distributed about said spool to produce substantially equal magnetic effect within said spool, one set of said coils being connected in series for one range of instrument indication, a second set of paralleled coils being connected in series with said first set for a second range of instrument indication, and a third set of coils in parallel with each other and in series with said first-mentioned and second sets, for a third range of operation, a common instrument terminal at the end of said third set of coils, and different range terminals connected at the juncture of said sets and at the end of said first-mentioned set.

9. In an electrical measuring instrument, a coil unit comprising a supporting spool member, a symmetrically formed cable wound upon said spool member to form a plurality of coils, having their component parts substantially uniformly distributed about said spool to produce substantially equal magnetic effect within said spool, one set of said coils being connected in series for one range of instrument indication, a second set of paralleled coils being connected in series with said first set for a second range of instrument indication, and a third set of coils in parallel with each other and in series with said first-mentioned and second sets, for a third range of operation, indicating means actuated by said coils when energized and a scale for indicating on either range of operation.

10. In an electrical measuring instrument, a coil unit comprising a supporting spool member, and a symmetrically formed cable wound upon said spool member to form a plurality of coils, having their component parts substantially uniformly distributed about said spool to produce substantially equal magnetic effect within said spool, said cable comprising nineteen conductors, a set of seven of said conductors being connected in parallel for one range of operation, a second set of six of said conductors being connected in two parallel rows of three each, and said second set being in series with the first set, and a third set of six conductors in series with each other and said first and second sets.

11. In an electrical measuring instrument, a coil unit comprising a supporting spool member, and a symmetrically formed cable wound upon said spool member to form a plurality of coils, having their component parts substantially uniformly distributed about said spool to produce substantially equal magnetic effect within said spool, said cable comprising nineteen conductors connected as follows; one coil end connected to a terminal, three coil ends connected to a second terminal, nine coil ends connected to a third terminal, seven coil ends connected to a fourth terminal, five sets of two coil ends each, connected by twos, and two sets of four each connected by fours.

12. In an electrical measuring instrument an indicating unit comprising a body member of molded insulating material having a plurality of threaded members molded therein, a bridge carried by a pair of said threaded members, a jewel carried by said bridge, a jewel carried by another of said threaded members, and a spindle rotatably mounted in said jewels.

13. In an electrical measuring instrument an indicating unit comprising a body member of molded insulating material having a plurality of threaded members molded therein, a bridge carried by a pair of said threaded members, a jewel carried by said bridge, a jewel carried by another of said threaded members, a spindle rotatably mounted in said jewels, a magnetic vane carried by said spindle, and a magnetic vane carried by said body member.

14. In an electrical measuring instrument an indicating unit comprising a body member of molded insulating material having a plurality of threaded members molded therein, a bridge carried by a pair of said threaded members, a jewel carried by said bridge, a jewel carried by another of said threaded members, a spindle rotatably mounted in said jewels, a magnetic vane carried by said spindle, a magnetic vane carried by said body member, said body member having a damping chamber molded therein, and a damping vane carried by said spindle in said chamber.

15. In an electrical measuring instrument, the combination of a molded insulating spool having a base and a bore therein, with a pair of posts carried by said base, an indicating unit having a molded insulating body and a cylindrical portion fitting in said bore, a fixed vane carried by said body, a movable vane carried by said body, indicating means operatively connected to said movable vane, and means for securing said body to said posts.

16. In an electrical measuring instrument, the combination of a support with movable indicating means carried thereby, and a coil unit having a plurality of symmetrically located and twisted conductors permanently connected together and provided with leads for selective use of the coils for different ranges of measurement.

17. In an electrical measuring instrument, the combination of a support with movable indicating means carried thereby, a coil unit having a plurality of symmetrically located and twisted conductors permanently connected together and provided with leads for selective use of the coils for different ranges of measurement, and connectors carried by said leads for use in connecting the conductors in external circuits.

18. In an electrical measuring instrument, the combination of a support with movable indicating means carried thereby, a coil unit having a plurality of symmetrically located and twisted conductors soldered together and provided with leads for selective use of the coils for different ranges of measurement, said indicating means including a plurality of scales, and indicia for indicating the leads corresponding to the different scales of said indicating means.

19. A cable for the coil unit of an electrical measuring instrument, comprising a plurality of symmetrically located and twisted conductors permanently connected in parallel, and a plurality of other symmetrically located and twisted conductors connected in series parallel with said first mentioned conductors.

20. A cable for the coil unit of an electrical measuring instrument, comprising a set of conductors connected in parallel with each other, and two sets of other conductors connected in series in each set, the two sets being in series parallel with the first mentioned set and the two sets being in parallel with each other.

21. A cable for the coil unit of an electrical measuring instrument, comprising a set of conductors connected in parallel with each other, two sets of other conductors connected in series in each set, the two sets being in series parallel with the first mentioned set and the two sets being in parallel with each other, and another set of conductors in series with each other and with the said two sets.

In witness whereof I hereunto subscribe my name this 16 day of March, 1928.

JOHN H. MILLER.